UNITED STATES PATENT OFFICE.

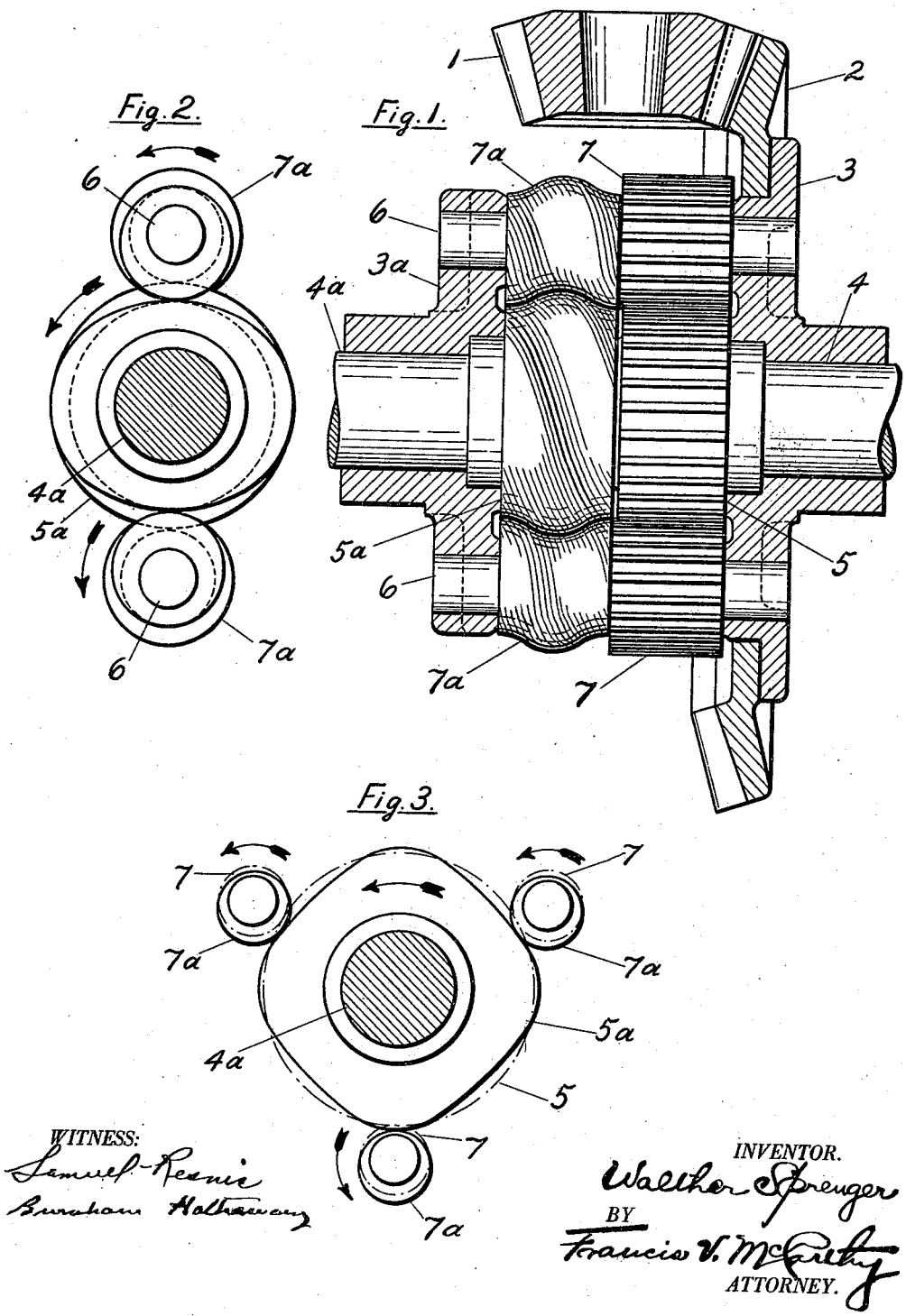

WALTHER SPRENGER, OF LYNN, MASSACHUSETTS.

DIFFERENTIAL GEARING FOR MOTOR-VEHICLES.

1,276,432.

Specification of Letters Patent.  Patented Aug. 20, 1918.

Application filed December 26, 1916. Serial No. 138,862.

*To all whom it may concern:*

Be it known that I, WALTHER SPRENGER, a subject of the Emperor of Germany, residing in the city of Lynn, in the county of Essex and State of Massachusetts, have invented certain new and useful Improvements in Differential Gearing for Motor-Vehicles, of which the following, with the accompanying drawings, is a specification.

My invention relates to differential gearing for motor vehicles and comprises a simplicity of construction and arrangement of parts that are most effective in bringing about the results desired to be obtained. While the ordinary spur or bevel gear differential may be satisfactory under even traction conditions, it necessarily fails on a slippery or uneven surface because its construction includes no means for minimizing the disadvantageous effects resulting from the slipping of the wheels of the vehicle. My present invention guards against the waste of time and power as well as needless wear of tires due to slipping of wheels, by locking both driving wheels automatically to the main driven gear immediately, upon failure of one or the other of the driving wheels to operate properly. The construction of my differential is such that the power of the engine is at all times distributed between the driving wheels in quantities proportional to the reaction of the wheels on the ground, thus increasing the efficiency of the vehicle. The construction provides also for a free change of speed of the driving wheels relative to each other as when the vehicle deviates from a straight course in turning a corner or otherwise.

The loss of power and wear of parts due to the individual motions of the parts hereinafter described are extremely small, since those motions occur only intermittently as when deviating from a straight course and the relative speeds of the surfaces in contact with each other always remain very low, even in cases of the greatest abuse.

These advantages are to be obtained from my invention, which I shall proceed to describe, first calling attention to the drawings, in which Figure 1 is a longitudinal section through the housing of a differential, showing gears and cams to be referred to hereinafter; Fig. 2 an end view of the cams shown in Fig. 1: Fig. 3 an end view of cams different in shape, number and position from those shown in Figs. 1 and 2.

Mounted on an engine shaft which is not shown, is a bevel gear 1 which meshes with a master gear 2 mounted upon a housing 3—3$^a$ in the usual manner. 4 and 4$^a$ are shafts carrying the driving wheels of the vehicle. Upon the inner end of the shaft 4 is mounted a gear 5 and on the inner end of the shaft 4$^a$ is mounted a cam 5$^a$ which are concentrically journaled in the walls 3—3$^a$ of the housing, as shown. Intermediate shafts 6 are eccentrically journaled in the walls 3—3$^a$ of the housing as shown, and on them are mounted the intermediate gears 7 and cams 7$^a$ in such a manner that a gear 7 and cam 7$^a$ on the common shaft 6 are locked together. The gears 7 mesh with the gear 5 and the cams 7$^a$ are at all times in contact with the cam 5$^a$.

In considering the operation of my invention it must be understood that, owing to their shapes and relative positions the driven cam 5$^a$ and the intermediate cams 7$^a$ cannot, at the same time, rotate in opposite directions nor can one turn alone; but they are allowed to rotate freely in the same direction and at the same time about their respective axes 4—4$^a$ and 6—6, as indicated by the arrows in Figs. 2 and 3, while revolving with the housing about the common axis 4—4$^a$. With this in mind, assuming that the housing 3—3$^a$, carrying the driven shafts 4, 4$^a$ and the intermediate shafts 6, is being turned by means of power applied through the gears 1 and 2, it will be seen that the gear 5 and cam 5$^a$ on shafts 4 and 4$^a$ respectively, become locked, due to the tendency of the gears 7 to roll about the gear 5 whereby they cause the cams 7$^a$ to interfere with the cam 5$^a$. So long as the vehicle follows a straight course the rotations of the shafts 4 and 4$^a$ are equal, consequently there is no individual rotary motion of the parts, the whole device and with it the driving wheels of the vehicle being caused to turn with the housing 3—3$^a$. The slipping of either wheel cannot occur because the device would remain locked and consequently the full power of the engine would go at once to the wheel which grips the ground, or, in case of minor traction irregularities, would divide itself automatically between the wheels proportionately to their grips on the ground. When deviating from a straight line, as in turning a corner, the two driving wheels of the vehicle and with them the gear 5 and cam 5ª rotate at different speeds, the result being that the gear 5, acting upon the gear 7 causes the latter to rotate about its own axis 6 in the direction opposite to that of the gear 5; and the cam 7ª, turning with the gear 7, allows the cam 5ª to follow its tendency to revolve faster or slower than the gear 5, as the case may be. In other words, the difference in the speeds of the gear 5 and the cam 5ª causes an individual motion of the gears 7 and cams 7ª, which is in harmony with and in its degree corresponding to this speed difference between gear 5 and cam 5ª. Upon assuming again a straight course the motions of the shafts 4 and 4ª become equalized and the individual rotation of parts ceases.

It will be observed that several modifications of my device are possible and I wish to have it understood that the application of cams of any shape, if employed in a similar combination as described herein are within the scope of my invention, whether they effect a definite locking as do the screw shaped cams shown in Figs. 1 and 2, or whether their locking effect is achieved by excessive friction as is the case with the eccentric shaped cams in Fig. 3. Also that the use of spiral or beveled gears in combination with cams for the purposes herein set forth are within the scope of my invention.

An important modification of my device is obtained by incasing the cams 7ª in metallic rings or jackets movably mounted thereon, the outer surfaces of the jackets being cylindrical and the inner surfaces made to conform to the surfaces of the cams 7ª. The jackets being located between the cams 7ª and the cam 5ª, provide surfaces upon which the cams 7ª and the cam 5ª operate constantly and uniformly.

Having described my invention, what I claim is:

1. In a differential gearing, the combination of a rotatable housing, two driven shafts, a gear mounted on the end of one shaft, a cam mounted on the adjacent end of the other shaft, a shaft journaled in the walls of the housing and a gear and cam mounted thereon so that the gears are in mesh and the cams in operative contact with each other.

2. In a differential gearing, the combination of a rotatable housing, two driven shafts, a gear mounted on the end of one shaft, a cam mounted on the adjacent end of the other shaft, shafts journaled in the walls of the housing, gears and cams mounted thereon, the gears being in mesh with the gear on a driven shaft and the cams being in operative contact with the cam on a driven shaft.

3. In a differential gearing, the combination of a rotatable housing, two driven shafts in line with each other, a gear mounted on the end of one driven shaft, a cam mounted on the adjacent end of the other driven shaft, and connections between the cam and gear, said connections comprising a shaft journaled in the walls of the housing and a gear and cam mounted on said shaft so that the gears are in mesh and the cams in operative contact with each other.

4. In a differential gearing, the combination of a rotatable housing, two driven shafts in line with each other, a gear mounted on the end of one driven shaft, a cam mounted on the adjacent end of the other driven shaft and connections between the cam and gear, said connections comprising shafts journaled in the walls of the housing and gears and cams mounted on said shafts so that the gears are in mesh with the gear on the driven shaft and the cams in operative contact with the cam on the driven shaft.

5. In a differential gearing, the combination of a rotatable housing, two driven shafts whose ends meet within the housing, a gear and cam mounted on the shafts and means for controlling the movements of the driven shafts, said means comprising a shaft journaled in the walls of the housing and a gear and cam mounted on said shaft so that the gears are in mesh and the cams in operative contact with each other at all times.

6. In a differential gearing, the combination of a rotatable housing, two driven shafts whose ends meet within the housing, a gear and cam mounted on the shafts and means for controlling the movements of the driven shafts, said means comprising shafts journaled in the walls of the housing and cams and gears mounted on said shafts so that said gears mesh with the gear mounted on a driven shaft and said cams are in operative contact with the cam mounted on a driven shaft at all times.

7. In a differential gearing, means for controlling the movements of the driving wheels of a motor vehicle, said means comprising a rotatable housing, two driven shafts, a gear and cam mounted on the adjacent ends of the driven shafts, a shaft journaled in the walls of the housing and a gear and cam mounted thereon in such a manner that they are at all times in operative contact with the gear and cam on the driven shafts.

8. In a differential gearing, means for controlling the movements of the driving wheels of a motor vehicle, said means comprising a rotatable housing, two driven shafts, a gear and cam mounted on the adjacent ends of the driven shafts, shafts journaled in the walls of the housing and gears and cams mounted thereon in such a manner that they are at all times in operative contact with the gear and cam on the driven shafts.

WALTHER SPRENGER.

Witnesses:
ERNEST GINGRAS,
ORPHÉE GINGRAS.